United States Patent [19]
Shodai et al.

[11] 3,793,055
[45] Feb. 19, 1974

[54] FORMING PROTECTIVE INORGANIC COATING ON SUBSTRATE

[75] Inventors: Masahiko Shodai, Takatsuki; Hideo Tomokawa, Neyagawa, both of Japan

[73] Assignee: Matsushita Electric Works, Ltd., Kadoma City, Japan

[22] Filed: June 17, 1971

[21] Appl. No.: 154,176

[30] Foreign Application Priority Data
June 25, 1970 Japan.................................. 45-56277

[52] U.S. Cl................ 117/47 R, 106/74, 117/47 R, 117/62, 117/705, 117/126 AF, 117/135.1, 117/148, 117/169 A
[51] Int. Cl........................... B44d 1/44, C01b 33/32
[58] Field of Search...... 117/47 R, 135.1, 705, 62, 117/169 A, 148, 126 AF; 106/74

[56] References Cited
UNITED STATES PATENTS
3,342,627  9/1967  Paxton et al.................... 117/169 A
2,944,916  7/1960  Evans........................... 117/169 A
3,423,229  1/1969  Kompanek et al............. 117/169 A
2,989,418  6/1961  Harbaugh....................... 117/169 A
3,232,782  2/1966  Shannon........................ 117/62

*Primary Examiner*—Murray Katz
*Assistant Examiner*—William R. Trenor
*Attorney, Agent, or Firm*—Armstrong & Wegner

[57] ABSTRACT

A method of forming an inorganic coating on a substrate is provided. The method includes applying on the surface of the substrate an aqueous inorganic coating composition comprising an alkali metal silicate and an inorganic condensed phosphate, which comprises applying before or after the application of the inorganic coating composition an effective amount of an aqueous curing agent solution of at least one compound selected from the group consisting of halides, sulfates, nitrates and organic acid salts of metals belonging to Groups II and III of Periodic Table and transition metals and ammonium halides, ammonium sulfate, ammonium persulfate, ammonium nitrate and inorganic acid salts of ammonium.

4 Claims, No Drawings

FORMING PROTECTIVE INORGANIC COATING ON SUBSTRATE

This invention relates to improvements in forming a protective inorganic coating on a substrate.

It is known to form a protective or corrosion-resistant coating on a substrate such as metal, wood, slate, asbestos sheet, etc. Most of conventional protective and/or anti-corrosive coatings of this kind are of organic ones such as asphalt, synthetic resins or the like. These organic coatings have various drawbacks that they are inflammable, low in thermal resistance, poor in hardness and not fully satisfactory in water-resistance. Further, prior to providing such organic coating, the surface must be cleaned. Even when an organic coating composition is applied on a clean surface, it is difficult to obtain a firmly adherent coating.

In order to overcome these drawbacks there has been proposed an inorganic coating composition comprising an alkali metal silicate and an inorganic condensed phosphate.

Such inorganic coating composition, however, have some drawbacks among which is that it takes a very long time to cure or to be insolubilized at the room or normal temperature. Thus, it takes about 6 months or more before it is completely and satisfactorily cured at the normal temperature (15° – 30°C.). Further during such long time exposure to the air the alkaline component in the coating composition reacts with carbon dioxide in the air to form carbonate(s) which deposits on the surface of the coating and therefore the appearance of the resulting coating is impaired. Further, during such long time exposure, there is a possibility that the coating will be deteriorated due to erosion before being completely cured or insolubilized. The curing may be promoted by heating but such is impractical and is impossible to practice in some cases. Further drawbacks of such inorganic coating are that it is not fully satisfactory in the resistance to water, resistance to weather, adherence and hardness.

Therefore it is an object of this invention to provide an improved method by which curing of such inorganic coating at the normal temperature is promoted.

Another object of this invention is to provide an improved method for forming a protective inorganic coating which is excellent in various properties such as water-resistance, weather-resistance, hardness, etc. and is firmly adherent to the surface of a substrate.

Other objects of this invention will be apparent from the following description.

Briefly, the objects of this invention may be attained by a method for forming an inorganic coating on a substrate by applying on the surface of the substrate a coating composition containing an aqueous solution of an alkali metal silicate and a condensed inorganic phosphate, characterized by applying before or after the application of the inorganic coating composition an aqueous solution of at least one compound selected from the group consisting of halides, sulfates, nitrates and organic acid salts of metals belonging to groups II and III of Periodic Table and Transition metals and ammonium halides, ammonium sulfate, ammonium persulfate, ammonium nitrate and organic acid salts of ammonium.

In carrying out the method of this invention, any inorganic coating composition which comprises an alkali metal silicate and a condensed inorganic phosphate and which may be cured or insolubilized by chemical reaction may be used. However, it is preferable to employ an inorganic coating composition which comprises an aqueous solution comprising an alkali metal silicate and a condensed phosphate prepared by heating a mixture of (A) a phosphate having an average composition formula:

$$MO \cdot xP_2O_5 \cdot yH_2O$$

wherein M represents a metal selected from the group consisting of Al, Mg, Ca, Mn, Zn, Fe and Cu, the atomic ratio M/P is 0.25 – 1.0, each of $x$ and $y$ is a real number and (B) a spinel type double oxide of (a) one metal selected from those belonging to Group II of Periodic Table and (b) at least one metal selected from transition metals and metals belonging to Group IV of Periodic Table.

As mentioned above the phosphate to be used is represented by the following formula:

$$MO \cdot xP_2O_5 \cdot yH_2O$$

wherein M is a metal selected from the group consisting of Ca, Mg, Al, Cu, Fe, Mn and Zn, the atomic ratio M/P is 0.25 – 1.0, and each of $x$ and $y$ is a real number. Preferably M consists of or mainly of Al. The value $x$ may be determined from $0.25 \leq M/P \leq 1.0$, but the value $y$ varies depending upon the particular product and ambient moisture condition because the degree of hydration varies. Thus the phosphate may be one or a mixture of two or more of commercially available primary phosphates of Ca, Mg, Al, Cu, Fe, Mn and Zn. It is preferable however that the phosphate consists of or mainly of primary aluminium phosphate, which may be added with or partly replaced by one or more of primary phosphates of Mg, Ca, Mn, Fe, Zn and Cu. If desired, the primary phosphate may be mixed with one or more of secondary phosphate such as $2Al_2O_3 \cdot 3P_2O_5 \cdot 3H_2O$, $2CaO \cdot P_2O_5 \cdot H_2O$, $2MgO \cdot P_2O_5 \cdot H_2O$, etc.; sesquiphosphates such as $Al_2O_3 \cdot 2P_2O_5 \cdot 3H_2O$; and $CaH_2P_2O_7$, etc. Even in a form of mixture, it should satisfy the above formula.

The above mentioned phosphate is mixed and reacted with a double oxide with spiral structure and then the mixture is heated to form a "condensed phosphate."

The double oxide to be mixed with the phosphate must have the so-called "spinel" structure. The metals forming the double oxide should comprise both (a) one metal selected from those belonging to Group II of Periodic Table and (b) at least one metal selected from transition metals and metals belonging to Group IV of Periodic Table. Preferable metals of (a) are zinc and magnesium, while preferable metals of (b) are Ti, Fe, Mn, Co and Cr.

The double oxides may be prepared in any known manner. Thus, for example, one metal compound selected from the group consisting of oxides, hydroxides, carbonates and organic acid salts of metals belonging to Group II of Periodic Table is mixed with at least one metal compound selected from the group consisting of oxides, hydroxides, carbonates and organic acid salts of metals belonging to Group IV of Periodic Table and transition metals. The mixture is calcinated at a temperature from 700°C. to 1,200°C. for 2 – 10 hours to form a double oxide with spinel structure. The proportions of the various metal compounds and the temperature and time for the calcination are determined in order to form double oxides with spinel structure. These conditions of course vary depending upon the particular metal compounds, but can be easily determined by referring to known literatures relating to the production of spinel type double oxides. In any case the metal compounds to be used should be those which can form oxides upon the above mentioned calcination.

The above mentioned phosphate and double oxide are mixed together and the mixture is heated to prepare the condensed phosphate. Generally, the double oxide is used in an amount of 0.2 – 1.5 parts by weight per part of the phosphate. The heat treatment conditions may vary over a wide range depending upon the particular apparatus (type of furnace) and particle size of the materials to be heated. However, generally, the mixture is heated at a temperature of 120°– 350°C. for 30 minutes to 10 hours, preferably 2 – 7 hours.

After the heat treatment or calcination the resulting solid mass (condensed phosphate) is pulverized into fine powder.

The condensed phosphate powder is then mixed with an aqueous solution of an alkali metal silicate, e.g., lithium silicate, potassium silicate, sodium silicate. If desired the alkali metal silicate may be modified by an alkali metal fluoride or alakli metal silicofluoride. In the water glass or aqueous solution of alkali metal silicate the solid content should be 0.3 – 1.5 parts by weight per part of the condensed phosphate. Further the amount of water may range from 1 to 2 parts by weight per part of the condensed phosphate.

If desired, an inorganic filler may be added. Examples of fillers which may be used are clay (bentonite), sand, calcium carbonate, gypsum, furnace waste, etc. The filler may be added in an amount of 15 percent by weight or less based on the total amount of the solid component in the composition.

The aqueous coating composition which is in the form of slurry or paste may be applied to the surface of an article to be protected in any suitable manner such as spraying, brush-painting roller-coating, airless-spraying, etc. Usually, the inorganic coating composition is applied in such amount that about 70–150 g. (as dried solid) of the coating will cover a square meter of the substrate surface.

The coating composition of this invention is curable at the room temperature but it takes a very long time to cure at the normal temperature (15° – 30°C.). In order to promote cure it is necessary to effect moisture-cure or thermal cure.

However, such moisture-cure or thermal cure is not convenient or not practical.

Therefore, according to the invention, a special but simple measure is taken to promote the curing, which is the novel and essential feature of the invention.

Thus, according to the invention, before or after applying the inorganic coating composition, there is applied an aqueous solution (sometimes referred to as "curing agent") of at least one compound selected from the group consisting of (1) halides, sulfates, nitrates and organic acid salts of metals belonging to Group II and Group III of Periodic Table and transition metals and (2) halides, sulfate, persulfate, nitrate and organic acid salts of ammonium.

Amoung the above compounds (1) and (2), most preferable ones are potassium alum, ammonium alum, aluminum nitrate, aluminum chloride, ammonium persulfate. Magnesium chloride, calcium chloride, zinc chloride, ammonium oxalate, ammonium acetate, ammonium sulfate and ammonium nitrate are also preferable ones. A mixture of two or more of these compounds may also be used.

According to one embodiment of this invention the above aqueous solution (curing agent) is applied on the surface of a substrate before the inorganic silicate-phosphate type coating composition is applied. According to another embodiment of the invention, the surface of a substrate is first coated with the inorganic coating composition and then on the coated layer there is applied the above mentioned curing agent. It is preferable, however, to apply the curing agent both before and after the application of the inorganic coating composition.

The molar concentration of the above mentioned compound (1) and/or (2) in the aqueous solution (curing agent) may be about 0.25 – 3 mols per liter of the solution. Preferably, the molar concentration is about 0.25 – 1 mol per liter in case of sub-coating and is about 1 – 3 mols per liter in case of top-coating. If the molar concentration exceeds the above mentioned upper limit there is a tendency that cracks are formed on the inorganic coating due to excessively rapid curing.

In any of sub-coating (pretreatment) and top-coating (after-treatment), it is preferable that the amount of application of the curing agent is such that about 0.001 – 0.5 mol, preferably about 7 – 10 g. of the compound (1) or (2) is present per square meter of the substrate surface or the inorganic coating already applied.

The application of the curing agent may be conducted in any suitable manner, such as spraying, brushing or dipping.

In case of sub-coating or pre-treatment, it is preferable that the inorganic coating composition is applied after the previously applied curing agent is substantially dried because if the latter layer is still wet the application of the inorganic coating composition thereupon will cause a rapid or violent reaction resulting in the formation of cracks, wrinkles or the like in the cured coating. Similarly, in the case of the top-coating or after-treatment, it is preferable that the aqueous curing agent is applied after the previously applied inorganic coating composition layer has been dried because if the aqueous curing agent is applied on the layer of the inorganic coating composition while the latter is still wet there would occur rapid or violent reaction which is undesirable as explained above. Thus, in any case, it is preferable that either one of the inorganic coating and curing agent to be contacted with each other is in substantially dry state and the other is in wet state. If desired a small amount (e.g. about 5 – 30 parts by weight based on the aqueous curing agent) of a high boiling point liquid (e.g. glycerine, ethylene glycol, etc.) miscible water may be added to the aqueous curing agent to control the rate of drying of the latter.

When the inorganic coating solution is applied on the substrate pretreated with the curing agent in the above mentioned manner, the curing of the inorganic coating is promoted even at the normal or room temperature (15° –30°C.) and there is obtained a firmly adherent, solid, hard and insolubilized inorganic coating with excellent resistances to water and weather within a relatively short period of time (e.g. 1 – 2 days). Similar result is obtained when an inorganic coating solution is first applied and after air-drying the same the curing agent is applied on the dried surface of the inorganic coating which has not yet been cured. It is of course preferable to apply the curing agent both before and after the application of the inorganic coating composition.

The method of this invention can be applied to any substrate. However, when the curing agent is applied prior to the application of the inorganic coating composition it is preferable that the surface of the substrate is such that can retain or held the curing agent or solution. Thus, those substrates having porous surfaces such as plates, sheets or the like of asbestos, cement, slate, wood, etc. are preferable. In such case, the curing agent is effectively impregnated or held in the porous surface of the substrate and therefore more firmful bonding of the surface with the subsequently applied inorganic coating is facilitated.

By the above curing, the coated composition is set or cured and becomes a hard, firmly adherent, water-resistant anti-corrosive coating on the surface of an article. The appearance of the coating is enamel or porcelain like. Further, the resulting coating is not only hard and anticorrosive but also excellent in resistance to heat, flame, water and weather, and is stable for a prolonged period of time.

This invention will be illustrated in the following Examples wherein all parts are by weight.

Example 1

A flexible slate (thickness 3 mm.) was first coated with a 1:1 mixture of an aqueous solution containing 1 mol/liter of aluminum chloride and an aqueous solution containing 0.5 mol/liter of ammonium persulfate of provide a coverage of 9 gr. of aluminum chloride and of ammonium persulfate per square meter. The coated slate was left to stand overnight at the room temperature (20°C.) to dry. Then the pretreated slate surface was coated with an inorganic coating composition to provide a coverage of 120 g. (as dry solid) per square meter. The inorganic coating composition was prepared as follows. A mixed phosphate (M/P = 0.4) consisting of 5 parts of primary aluminum phosphate and 5 parts of primary magnesium phosphate was mixed with 2 parts of zinc titanate. The mixture was calcinated at 130°C. for 4 hours to obtain a condensed phosphate. The condensed phosphate was pulverized and 2 parts thereof were mixed with 3 parts of sodium silicate (50 percent aqueous solution), one part of water and 0.4 part of white pigment (titanium white) to obtain the coating composition.

The coated slate was air-dried at about 20°C. for 2 days to obtain cured inorganic coating, the properties of which was as follows:

| | |
|---|---|
| Appearance: | Good |
| Adherence: | Cross-cut test (2 mm. × 2 mm.) 100/100 |
| Hardness: | Scratch hardness by Clemen's hardness tester 150 gr. |
| Water resistance: | >20 days (at 20°C.) |
| Hot water resistance: | >20 hours (boiling water) |
| Weather resistance: | Weather-O-Meter, no change after 1000 hours. |

Example 2

A light asbestos plate (thickness 5 mm.) was first coated with a 0.6:1 mixture of an aqueous solution containing 1 mol/liter of zinc nitrate and an aqueous solution containing 1 mol/liter of ammonium alum to provide a coverage of 10 g. of zinc nitrate and ammonium alum per square meter. After about 5 hours of air-drying at about 20°C., an inorganic coating composition was applied on the pretreated surface to provide a coverage of 100 g. (as dry solid) per square meter. The inorganic coating composition was prepared as follows. A mixed phosphate (M/P = 0.5) consisting of 4 parts of primary zinc phosphate, 5 parts of primary aluminum phosphate and 1 part of calcium pyrophosphate was mixed with 4 parts of $MnFe_2O_4$ (spinel type double oxide) and the mixture was calcinated at 140°C. for 4 hours to obtain a condensed phosphate. The resulting condensed phosphate mass was pulverized and 5 parts thereof were mixed with 7 parts of sodium silicate (50 percent aqueous solution), 2 parts of water and one part of white pigment (titanium white).

The coated slate was air-dried at about 20°C. for 2 days to form a cured inorganic coating which has excellent properties similar to those obtained in Example 1 except that the Clemen's hardness was 120 gr.

The same procedure was repeated except that no pre-treatment was conducted. No noticeable curing of the coating occurred and the coating was dissolved away in 1 minute when dipped in water at 20°C.

Example 3

A slate (thickness 5 mm.) was first coated with an aqueous solution containing 1.5 mol/liter of aluminum nitrate and 1 percent ethylene glycol to provide a coverage of 8 g. of alumunum nitrate per square meter. After air drying one night at the room temperature, there was applied on the pretreated surface an inorganic coating composition same as that used in Example 2, and the coating was air-dried at about 20°C. for 2 days to obtain a cured inorganic coating having the following properties:

| | |
|---|---|
| Appearance: | Good |
| Adherence: | Cross-cut test (2 mm. × 2 mm.) 100/100 |
| Hardness: | Scratch hardness by Clemen's hardness tester 150 gr. |
| Water resistance: | >15 days (at 20°C.) |
| Hot water resistance: | >15 hours (boiling water) |
| Weather resistance: | Weather-O-Meter, no change after 750 hours. |

The same procedure was repeated except that the pre-treatment was not conducted. No noticeable curing of the coating occurred, and the coating was dissolved away in 1 minute when dipped in water at 20°C.

Example 4

A mixed phosphate (M/P = 0.4) consisting of 55 parts of primary aluminum phosphate and 45 parts of primary calcium phosphate was mixed with 90 parts of magnesium titanate and the mixture was calcinated at 150°C. for 5 hours. The resulting condensed phosphate mass was pulverized and 50 parts thereof were mixed with 50 parts of sodium silicate (50 % aqueous solution) and 100 parts of water to obtain an inorganic coating composition. The coating composition was applied on the surface of a slate to provide a coverage of 95 g. (as dried solid) per square meter. The coated slate was allowed to air dry at the room temperature (20°C.) for 4 hours. Then, a curing agent, i.e., an aqueous solution containing 0.5 mol/liter of calcium chloride and 1 percent by weight of ethylene glycol was applied on the dried coating to provide a coverage of 8 g.

of calcium chloride per square meter of the surface. The top-coated slate was air-dried at about 20°C. for 2 days. The resulting cured inorganic coating had the following properties:

| | |
|---|---|
| Adherence: | Cross-cut test 100/100 Scratch test (drawing test) 8 |
| Hardness: | Scratch hardness by Clemen's hardness tester 200 gr. |
| Wear-resistance: | Tabor abraser 300 rounds, base not exposed in the abraded track |
| Water resistance: | >20 days (at 20°C.) |
| Hot water resistance: | >20 hours (boiling water) |

The same procedure was repeated except that the top-coating was not applied. No noticeable curing of the inorganic coating occurred and the coating was dissolved away within 1 minute when dipped in water at 20°C.

Example 5

A slate was first coated with a curing agent, i.e., an aqueous solution containing 1 mol/liter of aluminum chloride to provide a coverage of 9 g. of aluminum chloride per square meter. The surface wet slate was air-dried at about 20°C. for 6 hours. Then the pretreated surface was coated with an inorganic coating composition to provide a coverage of 100 gr. (as solid) per square meter. The coating composition was prepared as follows. A mixed phosphate (M/P = 0.5) consisting of 50 parts of primary aluminum phosphate, 10 parts of calcium pyrophosphate and 40 parts of primary zinc phosphate was mixed with 40 parts of barium manganate, and the mixture was calcinated at 140°C. for 4 hours. The resulting condensed phosphate was pulverized and 60 parts thereof were mixed with 40 parts of potassium silicate (solid content 50 percent) and 100 parts of water to obtain the inorganic coating composition.

The above coated slate was air-dired at about 20°C. for one day and then the same curing agent as above was applied on the dried coating surface to provide a coverage of 8 g. of aluminum chloride per square meter. The top-coated slate was air-dried at about 20°C. for 2 days. The resulting cured coating had properties comparable with those in Example 4, except that the scratch hardness was higher, i.e., 350 g.

Example 6

The procedure of Example 4 was repeated except that an aqueous solution containing 0.5 mol/liter of zinc nitrate was employed as a curing agent instead of the calcium chloride solution. The properties of the resulting cured inorganic coating were as follows:

| | |
|---|---|
| Adherence: | Cross-cut test 100/100 Scratch test (drawing test) 6 |
| Hardness: | Scratch hardness by Clemen's hardness tester 150 gr. |
| Wear resistance: | Tabor abraser 300 rounds, base not exposed in the abraded track |
| Water resistance: | >10 days (at 20°C.) |
| Hot water resistance: | >10 hours (boiling water) |

The same procedure was repeated except that the curing agent was not applied. No noticeable curing of the inorganic coating occurred and the coating was dissolved away within 1 minute when dipped in water at 20°C.

What we claim is:

1. A method of forming an inorganic coating on a substrate comprising applying to the surface of said substrate
   i. an aqueous inorganic coating composition comprising 0.3 to 1.5 parts of an alkali metal silicate and one part of a condensed phosphate prepared by heating a mixture of (A) a phosphate having an average composition formula:

$$MO \cdot xP_2O_5 \cdot yH_2O$$

wherein M represents a metal selected from the group consisting of Al, Mg, Ca, Mn, Zn, Fe and Cu, the atomic ratio M/P is 0.25 – 1.0, each of $x$ and $y$ is a real number and (B) a spinel type double oxide of (a) one metal selected from those belonging to Group II of Periodic Table and (b) at least one metal selected from transition metals and metals belonging to Group IV of Periodic Table, the ratio of the component (B) being 0.2 – 1.5 parts by weight per part of the component (A);
   ii. 0.001 to 0.5 mol per square meter of said surface of a curing agent of potassium alum, ammonium alum, aluminum nitrate, aluminum chloride, ammonium persulfate, magnesium chloride, calcium chloride, zinc chloride, ammonium oxalate, ammonium sulfate or ammonium nitrate in an aqueous solution; and
   iii. drying the thus treated substrate.

2. A method as claimed in claim 1 wherein the aqueous curing agent solution is first applied on the substrate surface, drying the same and then applying the inorganic coating composition thereon.

3. A method as claimed in claim 1 wherein the inorganic coating composition is applied first on the substrate surface, drying the same and then applying the aqueous curing agent solution thereon.

4. A method of claim 1, wherein said substrate is slate.

* * * * *